Figure 1:
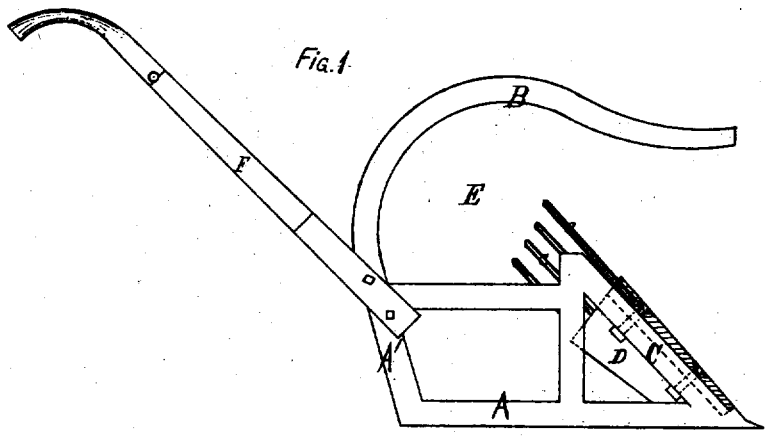

J. M. DICK.

Shovel Plow and Potato Digger Combined.

No. 4,216. Reissued Dec. 27, 1870.

WITNESSES.

J. R. Drake

C. N. Woodward.

J. M. Dick INVENTOR.

by J. Fraser & Co

Attys

N. PETERS, Photo-Lithographer, Washington, D. C.

United States Patent Office.

JAMES MILLEN DICK, OF BUFFALO, NEW YORK, ASSIGNOR TO HIMSELF AND WILLIAM H. ALBRO, OF SAME PLACE.

Letters Patent No. 105,922, dated August 2, 1870; reissue No. 4,216, dated December 27, 1870.

IMPROVEMENT IN SHOVEL-PLOWS AND POTATO-DIGGERS COMBINED.

The Schedule referred to in these Letters Patent and making part of the same.

I, JAMES MILLEN DICK, of Buffalo, in the county of Erie and State of New York, assignor to myself and WM. H. ALBRO, of same place, have invented certain Improvements in "Potato-Diggers and Shovel-Plows," of which the following is a specification.

*Nature of the Invention.*

The invention consists in the special construction of the whole frame, and in combining the shovel or digger with the frame, as hereinafter described.

*General Description.*

In the drawing—

Figure 1 is a side elevation, the digger in section, and

Figure 2:
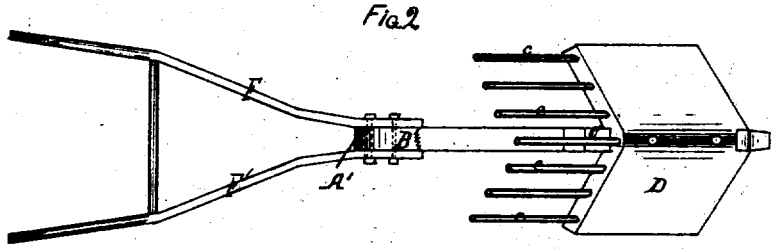

Figure 2, a plan, with the beam removed.

A is the bottom part;

A′, the back;

B, the beam, being a continuation of the back; and

C, the angular face, these all being cast in one piece and forming the frame.

D is the digger, having fingers or riddlers, *c c′*, for separating the dirt and potatoes.

The digger is attached to the slanting face C of the frame in any suitable manner, and this makes a complete and effective implement for the purpose herein stated.

F F′ are the handles attached to the back A′.

The special advantage of this construction of the frame is its lightness and durability, and, being made in one piece, is not liable to get out of order.

The bottom part A, being made long, straight, and narrow, is an important feature, as it allows the plow to rest lightly on the ground, and also serves as a sensitive fulcrum in guiding and turning the plow, the point *a* running beneath the rows or potato-hills, and the heel *b* acting as a guide.

Another important feature in my construction is the high curving of the beam B, thereby leaving a large open space, shown at E, for the mass of earth and vines to fall into as they pass over the fingers or riddlers, and thus prevent clogging, the space also allowing the potatoes to be thoroughly sifted as they fall, and enabling the vines to clear. The narrow frame greatly facilitates this action.

The novelty in my case is the construction of the whole frame in one piece, its narrow width and the high curving of the beam making the space E. This construction secures the maximum of strength with the utmost lightness, and the greatest economy of space and form. This same construction of the frame is applicable to shovel-plows as well as potato-diggers.

What I claim as my invention is—

The frame with the straight bottom part A, angular face C, and beam B, being a continuation of back part A′, all formed in one piece, in combination with the digger D, substantially as set forth.

In witness whereof I have hereunto signed my name in the presence of two subscribing witnesses.

JAMES M. DICK.

Witnesses:

I. R. DRAKE,

C. N. WOODWARD.